United States Patent [19]
Hagenweiler et al.

[11] 3,935,144
[45] Jan. 27, 1976

[54] CONTACT ADHESIVES

[75] Inventors: Kurt Hagenweiler; Kurt Scholz, both of Remagen-Kripp, Germany

[73] Assignee: Badische Anilin- & Soda-Fabrik Aktiengesellschaft, Ludwigshafen (Rhine), Germany

[22] Filed: June 3, 1974

[21] Appl. No.: 475,583

[30] Foreign Application Priority Data
June 5, 1973 Germany............................ 2328430

[52] U.S. Cl............. 260/24; 260/27 K; 260/75 NK; 260/828; 260/829; 260/841; 260/858; 260/859 R; 428/411
[51] Int. Cl.² ......................................... C08L 93/00
[58] Field of Search....... 260/24, 75 NK, 27 R, 829, 260/828, 841, 858, 859 R; 428/411

[56] References Cited
UNITED STATES PATENTS

| 3,681,277 | 8/1972 | Scholz | 260/24 |
| 3,821,165 | 6/1974 | Lohse | 260/75 NK |

Primary Examiner—Donald E. Czaja
Assistant Examiner—William E. Parker
Attorney, Agent, or Firm—Johnston, Keil, Thompson & Shurtleff

[57] ABSTRACT

Polyurethane contact adhesives are produced without added solvent from polyols, amorphous thermoplastic tackifiers and 3-isocyanatomethyl-3,5,5-trimethylcyclohexylisocyanate and which can be applied solvent-free to a great variety of substrates.

10 Claims, No Drawings

CONTACT ADHESIVES

The invention relates to contact adhesives of polyols, tackifier resins and 3-isocyanatomethyl-3,5,5-trimethylcyclohexylisocyanate and to a process for the manufacture of the products, which does not necessitate the use of solvents.

It is known that adhesives made from rubbers or phenolic resins can be applied without solvents. It has also been proposed to produce pressure sensitive adhesives from one or more polyols having three or more hydroxyl groups per molecule, optionally together with diols and/or monools, and polyisocyanates. For this purpose, the starting materials are reacted in such amounts that all the hydroxyl groups of the polyols and any diols and/or monools used react with the isocyanate groups of the polyisocyanates and thus form a completely crosslinked polyurethane. It is also essential to the invention that the polyurethanes should have an average chain length of from 130 to 285 chain atoms. Such adhesives, which do not contain any tackifier resins, harden very slowly. It is a further disadvantage that the adhesives, which are hard and rubbery solids at room temperature, can only be applied when softened, that is to say at relatively high temperatures. Conveying tacky, hot compositions in the machine as far as the spreader while keeping the compositions warm requires very complicated and expensive machinery. Such processes have not attained practical importance.

According to U.S. Pat. No. 3,437,622, a prepolymer containing isocyanate groups is produced by heating polyols, polyisocyanates and up to 10 per cent by weight of a tackifier resin, based on the weight of the polyol used, to 100°C for one hour; the prepolymer is then dissolved in an inert solvent. The adhesive solution is applied to a substrate and the solvent then evaporated. This converts the prepolymer to the polyurethane polymers which can be used as adhesives. The disadvantage of the process is that it is not possible to admix major amounts of resin with such systems and that only in the form of solutions can the prepolymers be processed or applied to substrates.

Adhesives obtained from isocyanates and esters of castor oil with carboxylic acids, and containing solvent, have been described in U.S. Pat. No. 3,246,049. These adhesives are also dissolved in non-polar solvents, such as xylene, and applied to the substrate. This procedure again entails expensive machinery since, after the spreading process, the solvent must be extracted by suction. This requires a drying tunnel which in the case of conventional spreader machines, is from about 40 to 60 m long and also requires an explosion-proof room. The speed at which the spreading process is carried out also depends on the efficiency of the drying tunnel and is therefore limited in most cases.

German Laid-Open Specification No. 2,002,457 discloses a process for the production of contact adhesives from polyalkylene ethers containing hydroxyl groups, tackifier resins and aliphatic or aromatic polyisocyanates. In this case, the starting materials are mixed without adding conventional inert solvents, and are applied solvent-free to the base. It is a disadvantage of this process that the contact adhesive can at most contain 30 percent by weight of a tackifier resin. If the resin content is higher, the adhesive loses some of its tack after some days or weeks, because it separates and becomes inhomogeneous or the viscosity of the adhesive rises so much that the product can no longer be handled by conventional metering and conveying equipment. Since the tack depends on the content of tackifier resins, it is desirable for some applications to incorporate major amounts of tackifier into the product.

It is an object of the present invention to provide contact adhesives of high tack and relatively low viscosities, which can be applied rapidly to substrates at room temperature by means of conventional feeding and metering devices, without inert solvents.

We have found, surprisingly, that these advantageous properties are exhibited by contact adhesives which are obtained, without addition of solvents, by mixing a. 28 to 94 per cent by weight of a polyol having a molecular weight from 300 to 8,000 and a hydroxyl number from 20 to 85 and b. 5 to 60 per cent by weight of an amorphous, thermoplastic, tackifier resin which has a softening point from 40° to 140°C and a molecular weight from 200 to 7,500, and reacting the mixture, without use of solvent, with c. 1 to 12 per cent by weight of 3-isocyanatomethyl-3,5,5-trimethylcyclohexylisocyanate, the percentages by weight being based on the total weight of the components (a), (b) and (c).

The contact adhesives according to the invention can be produced, and used, without the addition of conventional inert solvents, and possess, in addition to the advantageous properties already mentioned, high tack values, for example from about 0.2 kp to about 3 kp, measured in accordance with the Afera Standard Specification.

As a result of using 3-isocyanatomethyl-3,5,5-trimethylcyclohexyl isocyanate, also known by the trivial name isophorone diisocyanate, as the isocyanate component, the increase in viscosity of the reaction mixture on mixing the starting materials is insignificant, so that substantial amounts, that is to say more than 30% by weight, of tackifier resins can be incorporated into the contact adhesive. Furthermore, slight deviations in the amounts of the starting components used have a less adverse effect on the properties than is the case when using conventional aromatic diisocyanates and polyisocyanates, such as toluylene diisocyanate, diphenylmethane diisocyanate or mixtures of diphenyl- and polyphenyl-polymethylene-polyisocyanates. This means that it is simple to achieve reproducibility not only of the contact adhesives and of their tack values, but also of the properties of adhesive tapes coated with the contact adhesives. It is a further advantage that isophorone diisocyanate is less moisture-sensitive than aromatic polyisocyanates, so that the reaction between the polyol-tackifier mixture and the isophorone diisocyanate is not influenced adversely by the natural moisture which is always present in the manufacturing areas or on the substrate. Furthermore isophorone diisocyanate, because of its low vapor pressure, is less toxic than many other aliphatic or aromatic polyisocyanates.

The starting materials (a) used for the manufacture of the contact adhesives are polyols, for example polyester-ols or preferably, polyether-ols, which can be linear, partially branched and/or of branched-chain structure and which have molecular weights from 300 to 8,000, especially from 900 to 6,000 and preferably from 1,800 to 5,200. For example, it is possible to use polyether-ols which are manufactured by polyalkoxylation of dihydric or higher polyhydric, preferably dihydric and/or trihydric, alcohols, such as ethylene glycol, propylene glycol, 1,3-butanediol, 1,4-butanediol, trimethylolpropane and glycerol with ethylene oxide and/or propylene oxide. Mixtures of different polyalkylene oxides containing hydroxyl groups, for example mixtures produced by addition reactions of alcohol mixtures with ethylene oxide and/or propylene oxide, can also be used. The polyether-ols have OH-numbers from 20 to 85, especially from 25 to 70 and preferably from 30 to 50.

The polyester-ols, which have OH-numbers from 30 to 70, preferably from 35 to 50, are conventionally produced by condensation from aliphatic and/or aromatic dicarboxylic acids, such as phthalic acid and terephthalic acid, and preferably from succinic acid, glutaric acid, adipic acid, pimelic acid and sebacic acid, and dialcohols and/or trialcohols, such as ethylene glycol, 1,4-butanediol, 1,3-butanediol, 1,6-hexanediol, trimethylolpropane and glycerol, at elevated temperatures and, if appropriate, in the presence of catalysts, such as titanium salts or alkoxides. Polyester-ols having an acid number of less than 3 are particularly suitable.

3.Isocyanatomethyl-3,5,5-trimethylcyclohexylisocyanate which — as has already been mentioned — is known under the trivial name isophorone diisocyanate, is used as starting material (c).

The components (a) and (c) are preferably used in such ratios that from 0.6 to 1.4, preferably from 0.8 to 1.2, and in particularly from 0.8 to 0.98, equivalents of isocyanate groups of the isophorone diisocyanate are present per equivalent of hydroxyl groups of the polyols. This gives contact adhesives which may still contain free hydroxyl groups, which can be of advantage for some applications.

Even the reaction of the polyols with the isophorone diisocyanate gives products of a certain tackiness, but these are not advantageous contact adhesives.

An essential characteristic of the invention is the use of tackifiers as the component (b); even major amounts, for example up to 60 per cent by weight, of such tackifiers can be present in the contact adhesive without causing the products to separate or become inhomogeneous. The tackifiers are solid, amorphous, hard to brittle, thermoplastic materials which soften at temperatures from 40° to 150°C, preferably from 75° to 135°C, and in general have a molecular weight or average molecular weight from 200 to 7,500, preferably from 500 to 1,500. The resin should be compatible with the polyol, that is to say it should be possible to mix the resin with the polyol on heating to above the softening point of the resin, and the polyol-tackifier mixture should not separate into its components at room temperature.

Examples of suitable natural resins and modified natural resins are terpene resins (also referred to as polyterpene resins), balsams, rosin, hydrogenated rosin, and esters of rosin or of hydrogenated rosin, such as the glycerol ester, the pentaerythritol ester, the ethylene glycol ester, the diethylene glycol ester, the methyl ester and the propyl ester of (hydrogenated) rosin. Esters of hydroabietyl alcohol, which is produced on complete hydrogenation of rosin, are also suitable, examples being the benzoic acid ester or phthalic acid ester. Further good tackifier resins are the customary terpenephenol resins, alkylphenol resins, ketone resins, such as condensation products of cyclohexanone, coumarone resins, indene resins, hydrocarbon resins, polyvinyl isobutyl ether, polyvinyl acetate, vinyl acetate/vinyl laurate copolymers and polyolefins.

Preferred resins amongst the suitable tackifier resins are those which contain only few acid groups and of which the acid number is below 100, and preferably from 0 to 70, such as terpene resins, terpene-phenol resins and ester resins. It is particularly advantageous to use mixtures of different tackifier resins, for example mixtures of 2 to 4 different resins. Where resins of different softening points are used in the mixture, for example in the case of a mixture of resins of softening point around 70°C and resins of softening point around 120°C, the contact adhesives obtained can be used over a larger temperature range than contact adhesives based only on one resin.

The three starting components, namely the polyol (a), the tackifier resin (b) and the isophorone diisocyanate (c), are used in the following proportions:

Component a: 28 to 94 per cent by weight, preferably 40 to 80 per cent by weight,
Component b: 5 to 60 per cent by weight, in particular 15 to 50 per cent by weight, and preferably 30 to 45 per cent by weight and
Component c: 1 to 12 per cent by weight, preferably 2 to 8 per cent by weight.

An important factor determining the quality of the contact adhesive is that certain process conditions should be observed in the manufacture and use of the product. Good products are obtained if, first, the tackifier resin and the polyol are mixed at temperatures above the softening point of the resins and then the isophorone diisocyanate is added at temperatures below 50°C, preferably at from 15° to 34°C. These mixtures are then shaped, or applied to films or any other substrate, whilst in a condition where they are capable of flow. After shaping, the reaction is allowed to go to completion and this gives a more or less soft, largely solvent-resistant, practically insoluble contact adhesive, that is to say pressuresensitive adhesive composition.

The following is a suitable method of preparation of the contact adhesives: The commerically available polyol is expediently dehydrated, for example by heating under reduced pressure. It is advantageous to ensure that the water content of the product does not significantly exceed 0.1%. The same is of course true of the other components but these are usually more or less anhydrous anyway. The polyol is mixed with the resin or the resin mixture to give a clear, homogeneous polyol/resin mix. For this purpose, the components are in general heated, whilst stirring, say to temperatures above the softening point of the resin, for example to from 40° to 160°C, until a clear, homogeneous mixture has formed. Depending on the type of polyol and the type and amount of tackifier resin, the resulting mixture has viscosities which at room temperature vary from about 2,000 to 20,000 centipoise.

If no tackifier, or less than 5 per cent by weight, is used in preparing the contact adhesive, the adhesion is unsatisfactory. Tackifiers containing more than 60 per cent by weight of a resin possess very good adhesion but, because of the greater viscosity, the products can in such cases only be used at elevated temperatures, for example at above 50°C. Further customary auxiliaries, such as dyes, fillers, pigments, plasticizers, aging retardants, antioxidants and light stabilizers can also be admixed simultaneously with, or subsequently to, the resin, but are advantageously added before the isophorone diisocyanate. It is also possible to add conventional catalysts which accelerate the subsequent reaction of the hydroxyl groups with isocyanate groups. Examples of catalysts which have proved of value are dibutyl-tin dilaurate and tin-II octoate.

The starting components and auxiliaries are mixed by means of conventional metering and processing equipment known in polyurethane chemistry. When admixing the proposed amount of isophorone diisocyanate, temperatures above 50°C should be avoided if possible. It may be expedient to mix the isophorone diisocyanate with a part of the polyol/tackifier mixture and to incorporate the remainder of the polyol/tackifier mixture and the catalyst into this premix. The further processing of the resulting mixture should be carried out as rapidly as possible. Mixing and processing in this stage are generally carried out at temperatures of from 5° to 50°C, preferably from 15° to 35°C. The shaping is preferably carried out immediately after mixing, longer reaction times being allowed at lower temperatures and shorter reaction times at higher temperatures. Shaping is suitably carried out by means of the conventional methods for the manufacture of self-adhesive products.

As there is no solvent to be evaporated — since it is advantageous to dispense with the use of any solvent when preparing the mixture—any desired thickness of contact adhesive can be used and any desired type and size of shaped article can be produced. The main applications are the manufacture of adhesive tapes, adhesive films and adhesive labels, for which purpose a thin layer of the contact adhesive is applied to a fabric, to sheets of paper or to films of, for example, cellulose, cellulose acetate, cellophane, polyester, polyamide, polyvinyl chloride, polyethylene, polypropylene or the like. In general, the coating thickness is greater than $5/\mu$ and advantageously $25/\mu$, corresponding to coating weights of greater than 5, and greater than 25, g per m², respectively.

After completion of the processing step, the adhesive mixture is allowed to complete its reaction, which requires from a few seconds to a few hours, depending on the temperature. The viscosity of the mixture rapidly increases and the mixture soon gels and consolidates to form a more or less soft, elastic mass exhibiting outstanding contact adhesive properties. If, after coating, the composition is briefly heated to temperatures from 50° to 200°C. depending on the base used, the composition consolidates within 1 to several minutes and the film can be wound up, optionally after being covered with a release film.

The contact adhesive is also an ideal material for the production of self-adhesive mastics, insulations and the like. Shaped articles, for example sheets, made of the contact adhesive are tacky on their surface, whilst the composition as a whole is firm and elastic.

It is also possible to use conventional blowing agents when manufacturing the contact adhesive and to allow the mass to foam up after molding and during curing, until the desired density, say from 0.2 to 0.8 g/cm³ is reached. This gives foams with contact-adhesive properties.

In principle, a catalyst is not necessary for curing the contact adhesive after application, but the use of a catalyst substantially shortens the curing time. A deciding factor is that reaction time can be selected at will, according to the type and amount of the catalyst, to accord with the time required for application.

A modified procedure which is employed to incorporate as much resin as possible into the contact adhesive, is to use plasticizers, for example low molecular weight polystyrene, in amount of 5 to 30 per cent by weight, based on the sum of the components (a), (b) and (c). Styrene can also be used in place of polystyrene, in which case a conventional peroxide catalyst is admixed when mixing the components and the styrene is allowed to polymerize simultaneously with the curing of the polyurethanes.

The parts specified in the Examples are parts by weight.

EXAMPLE 1

A mixture of 100 parts of a trifunctional polyethylene/polypropylene ether-ol having a molecular weight of 4,500 and a hydroxyl number of approx. 36, 26.31 parts of alkylphenol resin (melting range 63°–70°C), 13.15 parts of terpene-phenol resin (melting range 117°–130°C) and 10.52 parts of the phthalic acid ester of hydroabietyl alcohol (melting range 60°–70°C) is heated to a temperature of 135°C under reduced pressure and intimately mixed and dehydrated. The mixture is then allowed to cool to from 20° to 25°C and 7.2 parts of 3-isocyanatomethyl-3,5,5-trimethylcyclohexylisocyanate and 0.72 part of tin-II octoate are added.

A polyester film is immediately coated with 70 g of adhesive per m². The adhesive is allowed to react for 24 hours at room temperature, giving a contact adhesive film having an adhesion of 1,000 p (measured in accordance with Afera Standard Specification 4001P8).

EXAMPLE 2 — 11

If the reactions are carried out analogously to the data in Example 1, but varying the type and amounts of the reactants, the adhesives listed in the table which follows are obtained.

| Examples Starting materials | 2 parts by weight | 3 parts by weight | 4 parts by weight | 5 parts by weight | 6 parts by weight | 7 parts by weight | 8 parts by weight | 9 parts by weight | 10 parts by weight | 11 parts by weight |
|---|---|---|---|---|---|---|---|---|---|---|
| Polypropylene ether-ol Molecular weight approx. 2,500 OH-number 56 | | | | | 50 | | | | | |
| Polypropylene ether-ol Molecular weight approx. 900 OH-number 25 | | | 100 | 100 | 50 | | 100 | | | |
| Polypropylene ether-ol Molecular weight approx. 3,000 OH-number 56 | | 100 | | | | | | | 20 | 100 |

-continued

| Starting materials | Examples 2 parts by weight | 3 parts by weight | 4 parts by weight | 5 parts by weight | 6 parts by weight | 7 parts by weight | 8 parts by weight | 9 parts by weight | 10 parts by weight | 11 parts by weight |
|---|---|---|---|---|---|---|---|---|---|---|
| Polypropylene ether-ol Molecular weight approx. 4,500 OH-number 36 | 100 | | | | | 100 | | 100 | 80 | |
| Alkylphenol resin Melting range 64–72°C | 35 | 40 | 50 | 10 | 45 | 29.2 | 55 | | 55 | 60 |
| Terpene-phenol resin Melting range 120–130°C | 17.5 | 15 | 10 | 2 | 10 | 14.6 | 10 | 30 | | |
| Phthalic acid ester of hydroabietyl alcohol Melting range 60–70°C | 14 | 10 | 15 | 7 | 15 | 11.6 | | | 10 | 20 |
| Methyl ester of hydrogenated colophony | | | | | | | | | 20 | 10 |
| Titanium dioxide | | | | 10 | | | | | | |
| Aerosil | | | | 2 | | | | | | |
| 3-Isocyanatomethyl-3,5,5-trimethyl-cyclohexylisocyanate | 7.2 | 10.5 | 4.9 | 5.1 | 7.6 | 7.2 | 4.9 | 7.2 | 7.9 | 10.5 |
| Tin-II octoate | 0.8 | 0.7 | 1 | 0.8 | 0.8 | 0.8 | 1 | 0.8 | 1 | 1 |
| Adhesion: measured after 48 hours in accordance with the Afera Standard Specification | 1.5kg | 0.8kg | 2kg | 0.6kg | 1.8kg | 1.2kg | 2.2kg | 0.6kg | 2.2kg | 1.9kg |

COMPARATIVE EXAMPLE 1

100 parts of a trifunctional polyethylene/polypropylene etherol having a molecular weight of 4,500 and an OH-number of 36 and 33.3 parts of alkylphenol resin having a melting range of 64° to 72°C are mixed, and dehydrated, under reduced pressure at a temperature of 130°C. The mixture is then allowed to cool to from 20° to 25°C and 5.3 parts of a mixture of 80% by weight of 2,4-toluylene-diisocyanate and 20% by weight of 2,6-toluylene-diisocyanate, and 0.6 part of tin-II octoate, are added.

The contact adhesive mixture very rapidly becomes viscous and imhomogeneous.

A polyester film is immediately coated with 70 g of adhesive per m². A contact adhesive film having an adhesion of approx. 0.8 kg is obtained. After storage for 48 hours or longer the adhesion has fallen by more than 50%.

COMPARATIVE EXAMPLE 2

A contact adhesive of 100 parts of a polyethylene/-polypropylene ether-ol having a molecular weight of 3,000 and an OH-number of 38, 46.6 parts of alkylphenol resin (melting range 64°–70°C), 20 parts of the phthalic acid ester of hydroabietyl alcohol (melting range 109°–119°C), 5.3 parts of toluylene-diisocyante (80:20) and 0.6 part of tin-II octoate is prepared analogously to the data of Comparative Example 1.

A polyester film coated with 70 g of adhesive per m² has an adhesion of 1 kg. After 48 hours' storage the adhesion fell by more than 50%. After several days, the adhesive film becomes inhomogeneous and unusable.

We claim:

1. A process for the manufacture of contact adhesives which comprises:

mixing (a) 28 to 94 percent by weight of a polyol having a molecular weight from 300 to 8,000 and a hydroxyl number from 20 to 85 and (b) 5 to 60 percent by weight of an amorphous, thermoplastic, tackifier resin which has a softening point from 40° to 150°C. and a molecular weight from 200 to 7,500, without the addition of solvents; and reacting the mixture, without the use of solvent, with (c) 1 to 12 percent by weight of 3-isocyanatomethyl-3,5,5-trimethylcyclohexylisocyanate, the percentages by weight being based on the total weight of the components (a), (b) and (c).

2. A process as claimed in claim 1 wherein the polyol is a polyether polyol having a molecular weight of from 900 to 6,000 and a hydroxyl number of from 25 to 70.

3. A process as claimed in claim 1 wherein components (a) and (c) are employed in amounts sufficient to provide 0.8 to 1.2 equivalents of isocyanate groups per equivalent of hydroxy groups.

4. A process as claimed in claim 1 wherein the tackifier resin is selected from the group consisting of terpene resins, balsams, rosin, hydrogenated rosin, esters of rosin, esters of hydrogenated rosin, terpenephenol resins, alkylphenol resins, ketone resins, coumarone resins, indene resins, hydrocarbon resins, polyvinyl isobutyl ether, polyvinyl acetate, vinyl acetate/vinyl laurate copolymers and polyolefins.

5. A process as claimed in claim 4 wherein a mixture of tackifier resins of different softening points is employed.

6. A process as claimed in claim 4 wherein the tackifier resin has an acid number of not more than 70.

7. A process as claimed in claim 1 wherein component (a) is employed in an amount of from 40 to 80 percent, component (b) in an amount from 30 to 45 percent and component (c) in an amount from 2 to 8 percent, all percentages being by weight.

8. A process as claimed in claim 1 wherein the polyol and tackifier resin are mixed at a temperature above the softening point of the resin and the isocyanate is added at a temperature below 50°C., the mixture being shaped or applied to a substrate while still in a flowable condition.

9. The solvent-free contact adhesive obtained by the process of claim 1.

10. The solvent-free contact adhesive of claim 9 as a thin layer applied to a substrate.

* * * * *